United States Patent [19]

Clayton et al.

[11] 4,430,028
[45] Feb. 7, 1984

[54] FRONT-DISCHARGE NITRATE TRUCK

[75] Inventors: Richard M. Clayton, Highland; Arthur . Johnson, American Fork, both of Utah

[73] Assignee: Savage Rite-Way Corporation, Salt Lake City, Utah

[21] Appl. No.: 282,873

[22] Filed: Jul. 13, 1981

[51] Int. Cl.³ .............................................. B65G 53/40
[52] U.S. Cl. .................................... 406/39; 137/615; 137/899; 406/166
[58] Field of Search ...................... 406/39, 43, 53, 67, 406/165, 166; 239/176, 654, 655; 414/503, 504, 505; 52/116; 137/615, 899

[56] References Cited

U.S. PATENT DOCUMENTS 3,187,910 6/1965 Decker et al. ...................... 406/39
3,270,921 9/1966 Nadolske et al. ................. 406/67 X Primary Examiner—Jeffrey V. Nase
Attorney, Agent, or Firm—Trask & Britt

[57] ABSTRACT

A front-discharge nitrate truck with an articulated boom is disclosed. The boom is anchored about a pivot point which allows it to travel in a horizontal arc of at least 180°. A joint in the boom near the anchor point enables the boom to be elevated in a substantial vertical arc. The boom elevation and orientation can be controlled by controls within the truck cab to locate the distal end of the boom at any ground position within a horizontal arc described by the distal end of the boom. The boom may further be folded alongside the truck for easy transport. The truck has its bed upon scales so that the truck operator may discharge a predetermined amount of prilled nitrate in a bore hold.

15 Claims, 11 Drawing Figures

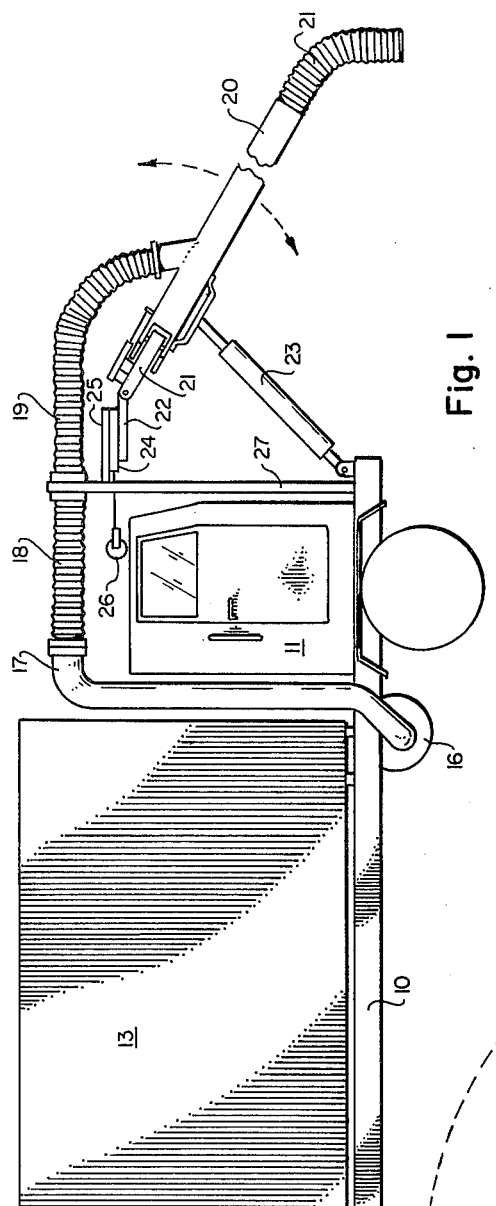
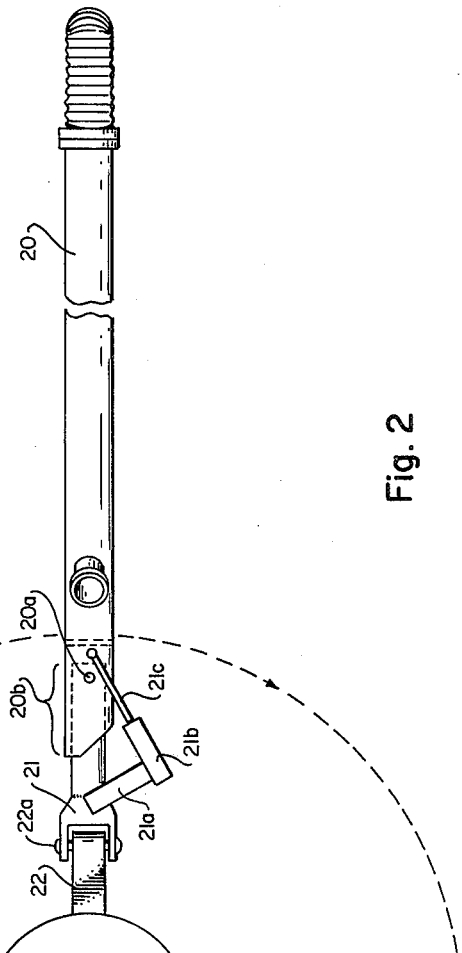
Fig. 1
Fig. 2

4,430,028

FRONT-DISCHARGE NITRATE TRUCK

BACKGROUND OF THE INVENTION

1. Field

This invention relates to front-discharge trucks in general, and in particular it relates to a front-discharge truck having an articulated boom wherein predetermined amounts of a prilled material, for example prilled ammonium nitrate, can be discharged through a hollow boom into a bore hole. The control of the boom is done by an operator within the cab of the truck.

2. Prior Art

Front-discharge trucks for various purposes have been known heretofore. Front-discharge concrete trucks are disclosed in U.S. Pat. No. 3,929,321 (Sims), while U.S. Pat. No. 3,930,567 (Robert L. Sims) discloses a movable chute for use with front-discharge concrete trucks. Front-discharge concrete trucks use a large conical bowl with vanes or flights in its interior. The vanes or flights convey the concrete to the front open end of the conical container whereby the concrete then discharges by gravity down a chute or other means.

Articulated booms of various types are known in the art. U.S. Pat. No. 3,367,280 (Bennett et al) illustrates a truck having a rigid boom which may be elevated to various positions through which solids such as concrete or other wet slurries or pastes may be pumped. U.S. Pat. No. 3,860,175 (Westerlund et al) discloses a trailer with a pivotable boom wherein two hydraulic cylinders are used to pivot the boom about a limited horizontal arc. The boom may be telescoped.

U.S. Pat. No. 2,965,304 (Drause) discloses a folding-boom, race-track sprinkler. The boom has a hinge on it about midway in its length. Another sprinkling apparatus is disclosed in U.S. Pat. No. 2,995,307 (McMahon). This boom disclosed in McMahon may fold in a vertical fashion to fold alongside the truck. It has a hinge about midway in the boom length. The boom may move manually about a pivot point near the front end of the truck to assume a position extending laterally from either side of the truck. U.S. Pat. No. 3,995,754 (DeKoning) illustrates a front-loading garbage truck wherein a large diameter flexible hose is attached atop the truck at the front and is controlled by a hydraulic cylinder and manually at its distal end whereby the free end may be placed in garbage pit containers to suck the garbage into the truck.

OBJECTS OF THE INVENTION

It is an object of this invention to provide an efficient, maneuverable truck for hauling and delivering prilled materials such as ammonium nitrate, from a bulk facility to bore holes.

Another object of the instant invention is to provide a front-discharge truck having a highly maneuverable boom whereby material may be precisely delivered to a particular bore hole by an operator within the cab of the truck.

A further object of the instant invention is to provide a truck whereby a predetermined amount of material may be delivered to a bore hole.

A further object of the instant invention is to provide a front-discharge truck with an articulated boom whereby the boom may be carried in a supported position alongside the truck during travel.

DESCRIPTION OF THE DRAWINGS

FIG. 1 is an elevational, side view of a front-discharge truck having an articulated boom;

FIG. 2 is a plan view of the articulated boom and its horizontal control means;

DESCRIPTION OF THE INVENTION

Figure 3:
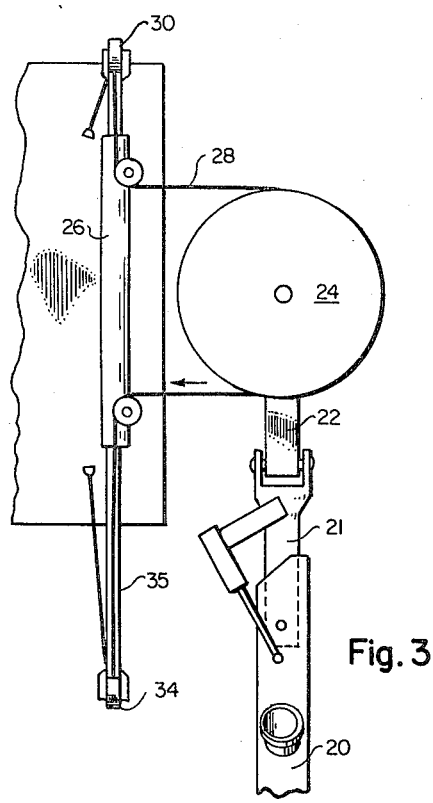
FIG. 3 is a plan view of the articulated boom oriented in a direction 90° to the longitudinal axis of the truck.

A front-discharge truck uniquely suited for hauling prilled materials such as ammoniun nitrate to a particular site and delivering to a precise location an accurate amount of material has been invented. The front-discharge truck has a large, elongated hopper for hauling prilled material. An auger or screw conveyor is located in the bottom of the hopper to transport prilled material to a forward discharge port located in the base of the hopper. The prilled material discharges into a rotary vane feeder which rotates at a predetermined or variable speed. A high velocity stream of air passes through the bottom section of the vane feeder to entrain prilled material and carry it to a maneuverable, articulated boom located above and in front of the cab of the truck.

The boom may be maneuvered by an operator within the truck cab to cause the free end of the boom to assume any position adjacent to the ground within an approximately 180° horizontal arc. Prilled material is blown through flexible conduit and hollow sections of the boom to be discharged into a bore hole. The truck hopper is fixed on scales attached to the frame so that the truck operator, by monitoring a readout display within the cab of the truck, can determine the amount of material being discharged.

The truck generally has its engine located at the rear of the truck and has at least one hydraulic system to drive hydraulic motors for the air blower, the screw conveyor and the vane feeder. A different hydraulic system is preferably used to power hydraulic cylinders to elevate the boom to a particular elevation and to operate a hydraulic cylinder which propels the boom about a horizontal arc of 180°. The boom is generally constructed of three segments, an anchor segment, an intermediate segment and a distal segment, and is articulated so that it may be folded so that the longest boom segment rests lengthwise in a substantially horizontal disposition alongside the truck during travel.

Further description of the invention may be facilitated by reference to the attached drawings. FIG. 1 is an elevational side view of the front-discharge truck for transporting and delivering prilled materials such as ammonium nitrate to an exact location. The truck comprises a pair of elongated frame members running the length of the truck (the right frame member 10 is illustrated) supporting a cab 11 at the front of the truck and an engine 12 at the rear of the truck. Generally, the truck has tandem axles with dual wheels on each end of each axle at the rear. A V-shaped hopper 13 is supported by the frame member with a set of scales being intermediate of the hopper and the frame members. (The scales are not shown.) A blower 14 is illustrated with an air filter 15 located on the suction side of the blower. The blower provides a high velocity stream of air to the rotary vane feeder 16 located beneath the central front portion of the truck hopper. The vane feeder, along with an auger or screw conveyor within the hopper, controls the amount of prilled material which is fed through the vertical pipe 17 and through flexible hoses 18 and 19 to the hollow, distal boom segment 20 and the flexible distal hose 21.

An articulated boom comprised of boom segments 20, 21 and 22 are joined together to provide the boom with hinge means to move in a vertical arc of about 30° and to fold alongside the truck. Rotation means enables the boom to swing in a horizontal arc of about 180°. Boom segment 20 is the distal segment while segments 21 and 22 are the intermediate and anchor segments, respectively. A hydraulic cylinder 23 is attached to the proximal end of boom segment 20 to control the elevational position of the boom. The boom segment 22 (anchor segment) is attached to a turntable 24 which is supported by a circular base 25. (Boom segment 21 could be attached directly to turntable 24 if turntable 24 were wider than base 25 or had a projection to serve the same purpose as anchor segment 22.) A double-acting hydraulic cylinder 26 acting through cables wrapped around the turntable 24 control the swing of the boom through the horizontal arc. The base member 25 is supported by vertical stanchions 27 anchored to the frame member 10 or to forward extensions of said frame member.

The boom structure and turning mechanism is illustrated in more detail in FIG. 2. A length of cable 28 is anchored at one end 29 and is passed about a pulley 30 which is at the end of the rod attached to a piston within hydraulic cylinder 26. A change of direction pulley 32 changes the direction of cable 31 moving transverse to the truck. The cable 28 contacts at least half of turntable 24. The cable 28 then passes about change of direction pulley 33 and about pulley 34 at the end of rod 35. The other end of the cable is anchored at anchor 36. As the double-acting cylinder 26 is actuated, one rod moves into the hydraulic cylinder while the other rod extends, thus causing the cable to move in a particular direction, thereby rotating the turntable.

The articulated boom is illustrated in FIG. 2 whereby the anchor boom segment 22 is shown extending from beneath turntable 24 to which it is attached. The second boom segment 21 (intermediate segment) is attached by a pin or bolt to boom segment 22. The pin or bolt 22a is in a horizontal position so that boom segment 21 moves (folds) in a vertical manner with respect to the anchor boom segment 22 which moves only in a horizontal (or substantially horizontal) plane. Distal boom segment 20 is attached by a vertical pin or bolt 20a to boom segment 21. Pin 20a is positioned vertically so that a hinge joint is formed between boom segments 20 and 21 whereby distal boom segment 20 may be folded horizontally with respect to boom segment 21, provided intermediate segment 21 is on a horizontal orientation.

Movement between boom segment 20 and boom segment 21 is provided by hydraulic cylinder 21b which is attached by an arm 21a to boom segment 21. Hydraulic cylinder 21b is displaced laterally from the longitudinal axis of the articulated boom so that it may provide a force at an oblique angle to boom segment 20 to move boom segment 20 with respect to boom segment 21. Preferably, hydraulic cylinder 21 is located at an angle of at least 5° and preferably about 10° up to about 20° from the longitudinal axis of boom segment 20. As rod 21c is withdrawn within hydraulic cylinder 21b, boom segment 20 starts to rotate about pin 20a and to fold with respect to boom segment 21. A short segment of boom segment 20 identified in FIG. 2 as 20b slightly overlaps boom segment 21 to form a spur which permits boom segments 20 and 21 to be rigidly interlocked when rod 21c has fully extended boom segment 20.

Figure 4:
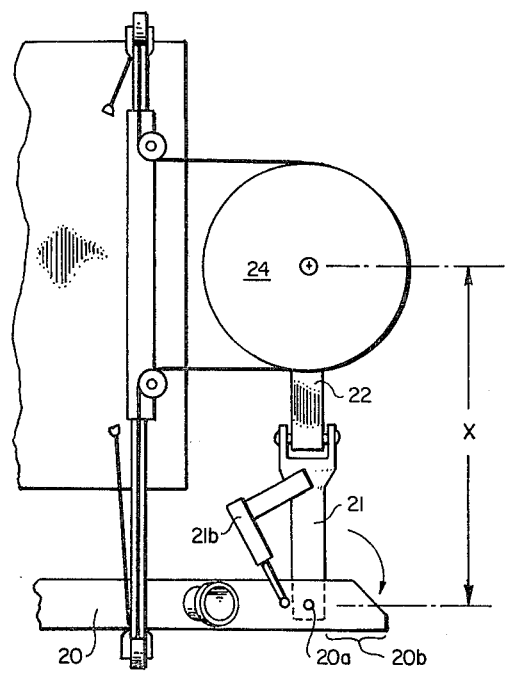
FIG. 4 is a plan view of the articulated boom in a folded position alongside the truck.

The horizontal or lateral articulation of the boom, is illustrated in FIGS. 3 and 4. In FIG. 3 the boom is shown swung 90° from the longitudinal-axis position shown in FIG. 2. Hydraulic fluid is introduced to cylinder 26 to extend rod 35 thereby moving pulley 34 outwardly. As pulley 34 extends, pulley 30 is drawn towards cylinder 26. The movement of cable 28 in the direction shown by the arrow causes turntable 24 to revolve clockwise and to position boom 20 at an angle 90° displace from its position shown in FIG. 2.

The boom articulation is further shown in FIG. 4. Distal boom segment 20 is positioned along the side of the truck whereby it may rest on a pedestal in a secure manner during transport or travel of the truck. The position of boom segments 22 and 21 are the same in FIG. 4 as they are in FIG. 3. In FIG. 4 cylinder 21b has had fluid introduced to withdraw the cylinder rod thereby causing the distal boom segment 20 to fold with respect to intermediate boom segment 21. Boom segment 20 is caused to swing until it is at an angle of approximately 90° with respect to boom segment 21. Boom segments 21 and 22 are of sufficient length such that the distance from the center turntable 24 to pin 20a (distance "X") is only slightly greater than one-half the width of the truck hopper. Thus, when boom segments 21 and 22 are disposed at a 90° angle to the longitudinal axis of the truck, distal boom segment 20 in a folded position is substantially parallel to the longitudinal axis of the truck and substantially adjacent to the external sidewall of the truck hopper. Boom segment 20 in a folded position is also in a substantially horizontal position.

Figure 5:
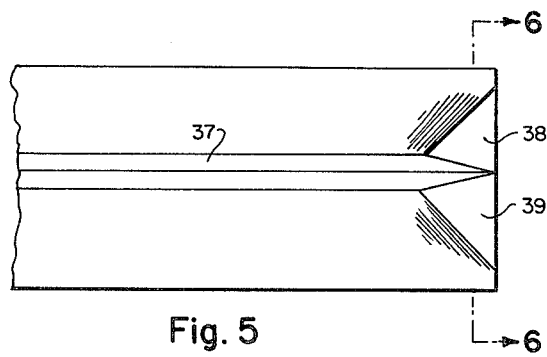
FIG. 5 is an plan view of the truck hopper.

The bed or hopper is illustrated in FIG. 5. An elongated shield 37 covers the screw conveyor. A slight space exists between each edge of the shield down the sidewall of the hopper so that the prilled material may be introduced into the screw conveyor and thereby conveyed to the discharge port. At the forward end of the bed a pair of wing-like sheets 38 and 39 contact the forward edge of the bed and diagonally contact the shield to seal the space between the shield 37 and the sidewalls in the general vicinity of the discharge port.

Figure 6:
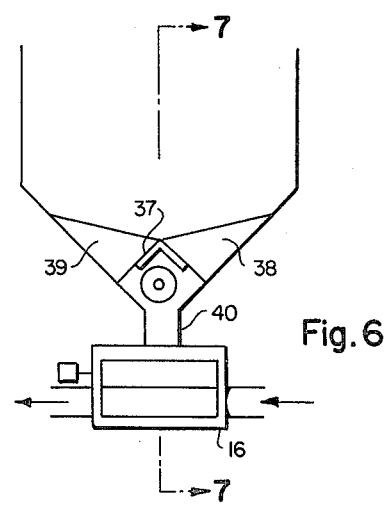
FIG. 6 is an exposed end view of the truck hopper along section lines 6—6.

The position of the wing-like members 38 and 39 is further illustrated in FIG. 6. The elongated shield 37 has an elongated space between each edge of the shield and the sidewalls. The wing-like sheets seal off this space in the vicinity of the discharge port 40. Thus, material cannot flow directly down the discharge port but must be carried into the discharge port vicinity by the screw or auger. Thus, the speed of the conveyor controls how much material passes into the discharge port 40.

Figure 7:
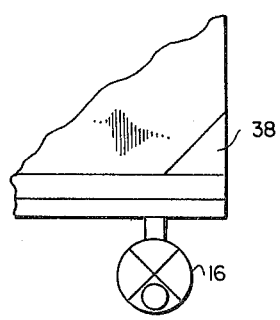
FIG. 7 is an elevational sectional view along section lines 7—7 of FIG. 6 illustrating the conveyor cover within the truck hopper.

Generally, the screw conveyor is operated so that the material passing through the discharge port 40 is at a rate such that the vane feeder is filled about two-thirds in each section. An airstream is introduced at a high velocity into one side of the vane feeder and discharged from the other side of the feeder. The air passes through the lowest section (see FIG. 7) of the vane feeder. A separate chamber is conventionally provided for entrainment of prilled material in air. However, by using the lower section of the vane feeder for this purpose a substantial space saving is realized which is critical for a vehicle used in rough, uneven terrain. If a separate chamber were used it would have to be at a lower level than the vane feeder thus reducing the clearance of the vehicle in regard to road obstacles and hazards.

Figure 8:
FIG. 8 is an elevational view of the scoop conveyor located at the bottom of the truck hopper.

FIG. 8 illustrates a typical screw conveyor used in this invention. Preferably, the diameter of the screw conveyor at the discharge end has a greater diameter "b" than at the other end "a". Thus, as the screw conveyor turns it picks up some material along its entire length.

Figure 9:
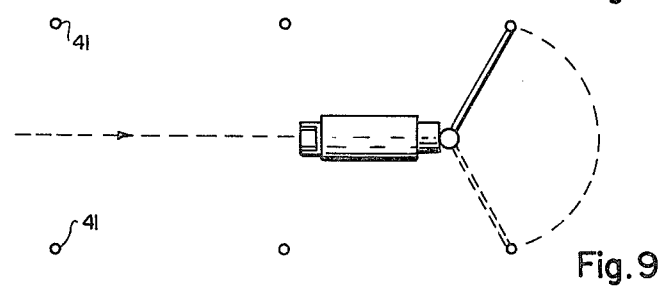
FIG. 9 is a plan view of the truck in operation in the field.

In operation, a truck may be driven between two rows of bore holes 41 (see FIG. 9). From a given position, the articulated boom may be swung to the right and to the left to service a bore hole from each row. The length of the boom, which is generally 15 to 18 feet, may thus cover bore holes which are up to 30 to 36 feet apart. Rows of bore holes which are closer than that may be easily serviced by positioning the truck so that an arc of less than 180° is required during the swing of the boom from a left row of bore holes to a right row of bore holes. Thus, by positioning the truck and the manipulation of the elevation of the boom and its horizontal swing, the truck driver may, without leaving the cab of the truck, direct a predetermined quantity of prilled ammonium nitrate to one bore hole and then swing the boom in the opposite direction to deliver a predetermined amount of ammonium nitrate to a bore hole in another row. By moving the truck either forward or backward, a truck operator may fill the next pair of opposed holes.

Prior to the instant invention, trucks with rear-discharge, flexible hoses were used. With such trucks, it was generally necessary to have a truck operator and a helper.

The helper would carry the flexible hose attached to the back of the truck and direct the driver to a particular location. The helper would place the discharge end of the hose in a bore hole and then return to the rear of the truck to operate the controls to deliver the material to the bore hole. The helper would then shut off the controls, pick up the flexible hose from one hole and walk it over to an opposed hole. This operation was time consuming and required two operators in order to fill the bore holes.

The present invention offers many advantages. All operations of the boom are in front of the truck where it is easily observed by the driver. All controls for the boom and the other operating equipment such as the blower, auger, and vane feeder are within the cab of the truck. Furthermore, the speed of the various devices may be controlled so that the rate of flow of material is controlled. Also, the boom when not in use may be folded alongside the truck so that it is out of the way and not likely to be damaged and may further rest on a pedestal or platform so that while the truck is being driven over rough roads, which is often the case, the boom is secure and will not be damaged.

The three segment boom is preferred for purposes of the instant invention. While a boom of two sections attached to a turntable could perform the delivery function, it would be subject to damage during transport. The use of three sections permits the boom to fold alongside the truck for safe transport.

The distal boom segment is the only hollow segment. Although a solid distal segment having flexible hose running the entire boom length could be utilized, the hollow distal segment provides a more durable construction.

Because the articulated boom must fold for secure transport, the anchor and intermediate segments have a combined length which is approximately equal to one-half of the truck hopper width. Also, since it is desirable that the elevation means, e.g., hydraulic cylinder and piston rod be affixed to the distal segment to reduce stress on the hinge joints, it is further advantageous to have relatively short anchor and intermediate segments—otherwise an unusually long hydraulic cylinder would be required.

Typically, the intermediate and anchor segments are each about two to three feet in length. The distal boom segment may be about ten to fourteen feet in length.

The overhead locations of the proximal end of the articulated boom is advantageous inasmuch as the boom is self-emptying since its discharge end is lower than its inlet end when material is being delivered to a bore hole. Also, the overhead location permits the operator to see everything under the boom, including a bore hole, which facilitates the accuracy with which the operator can control the free end of the boom so as to drop the flexible hose "trunk" attached to the hollow boom discharge end directly into a bore hole.

The lateral movement of the boom may be provided by one or two hydraulic motors in place of a double-acting hydraulic cylinder.

The hydraulic systems utilized to power and control the various functions of the material delivery system and of the articulated boom are particularly adapted for the purposes of this invention.

Figure 10:
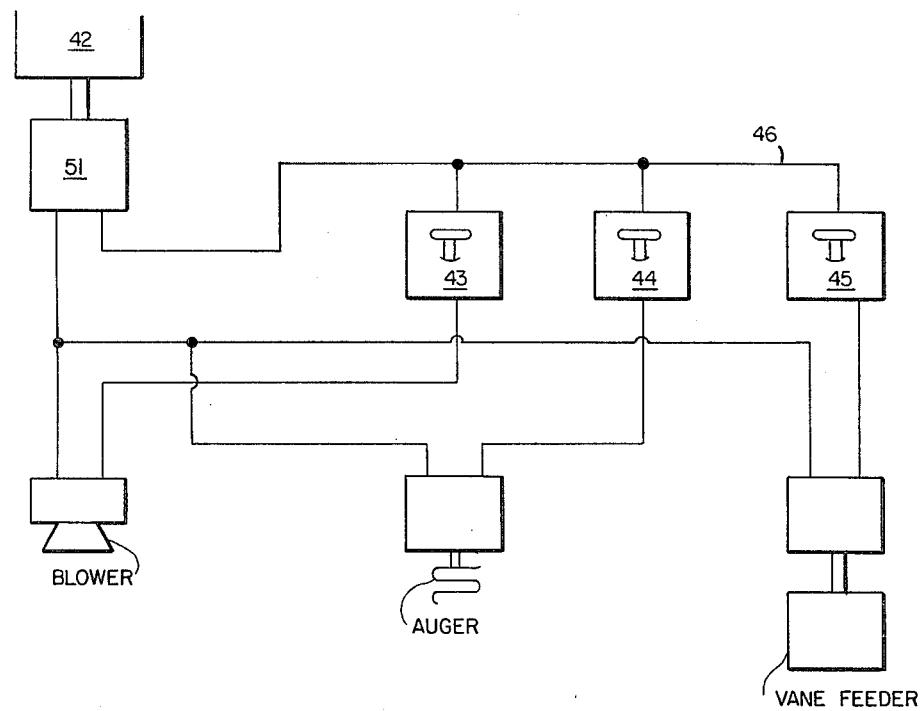
FIG. 10 is a schematic drawing of the hydraulic system for materials handling.

The air blower, auger and vane feeder are powered and controlled by a hydraulic system illustrated in FIG. 10. A hydraulic pump 51 is driven by a power take-off drive 42 driven by the truck engine. The hydraulic pump provides pressurized hydraulic fluid to the hydraulic control valves located in the truck cab. The truck operator has available separate valves for each function within the air-material delivery system. A blower valve 43, auger valve 44 and vane feeder valve 45 are fed by hydraulic line 46. Separate hydraulic lines connect each control valve to the device which it controls.

Figure 11:
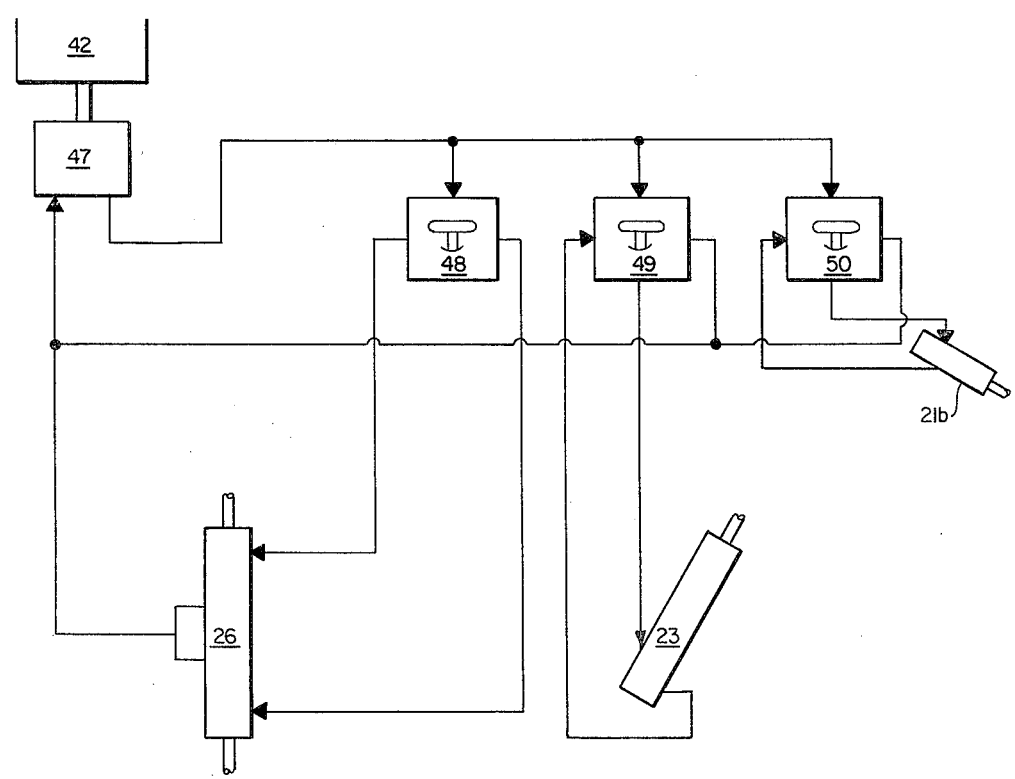
FIG. 11 is a schematic drawing of the hydraulic system for boom handling.

Another hydraulic system (FIG. 11) provides pressurized hydraulic fluid to the hydraulic cylinders associated with the articulated boom. A second hydraulic pump 47 is connected with these valves. The valve 48 which controls the double-acting cylinder determines which side of the cylinder the fluid is introduced as well as the rate at which fluid is introduced. This valve controls the turning of the boom to the right and to the left. The elevation valve 49 controls fluid flow into and out of the elevation cylinder. The extension valve 50 controls fluid flow to and from the extension cylinder which extends and retracts (folds) the boom.

To place the boom in its folded position alongside the truck, the boom is raised to its uppermost (horizontal) position by extension of the elevation cylinder rod. It is then swung to the extreme right (perpendicular to the longitudinal axis of the truck) by extension of the right rod of the double-acting cylinder. The distal segment of the boom is then folded to be parallel with the side of the truck by retracting the rod of the extension cylinder. Since the combined length of the anchor and intermediate segments is generally slightly wider than the truck, the distal segment of the boom is lowered slightly (by slight retraction of the elevation cylinder rod) to bring the boom adjacent the truck hopper and onto a pedestal sized and located to hold the boom in a secure manner during travel of the truck over rough roads and off-road use.

We claim:

1. A front-discharge truck for transporting finely-divided, blowable materials comprising:
   a truck frame supported by rear driving wheels and front steering wheels;
   an elongated hopper having sloping sidewalls and a forward-located, discharge port supported by said truck frame;
   conveying means located adjacent the bottom of said hopper to convey material in said hopper to said forward discharge port;
   an operator cab located proximate the forward wall of said hopper;
   a vane-type feeder located underneath and communicating with said hopper discharge port;
   an air blower having its discharge outlet connected by conduit means to the lower part of said vane feeder;
   an articulated boom having at least two segments, one of which is an anchor segment pivotally attached to a support frame above the cab area, said boom having drive means to swing the boom in a horizontal arc of about 180° from a position about perpendicular to the right side of the truck to a position about perpendicular to the left side of the truck;
   boom elevation means to elevate and lower a forward section of the boom;
   air and material transport conduit communicating with the discharge outlet of said vane feeder and communicating with said boom to provide discharge of air and material proximate the free end of said boom;
   operator control means to control boom elevation, boom swing, conveying means, blower and vane feeder located within said operator cab.

2. The front-discharge truck of claim 1 wherein the conveying means is an auger driven by a hydraulic motor.

3. The front-discharge truck of claim 1 wherein said vane feeder has at least four (4) vanes with the air inlet and air/material outlet located in an opposed position in the lower position of the feeder.

4. The front-discharge truck of claim 3 wherein said vane feeder is driven by a hydraulic motor.

5. The front-discharge truck of claim 3 wherein said vane feeder is oriented transversely to said truck frame.

6. The front-discharge truck of claim 1 wherein said air blower is driven by a hydraulic motor.

7. The front-discharge truck of claim 1 wherein said boom elevation means is a hydraulic cylinder and piston.

8. The front-discharge truck of claim 1 wherein said articulated boom has a distal segment which is hollow to provide an air/material conduit.

9. The front-discharge truck of claim 1 wherein said articulated boom comprises three (3) segments; an anchor segment, an intermediate segment and a distal segment, said anchor segment connected to said intermediate segment by a horizontal hinge joint permitting said intermediate segment to swing in a vertical plane, said intermediate segment connected to said distal segment by a vertical hinge joint permitting said distal segment to fold in a horizontal plane with respect to said intermediate segment.

10. The front-discharge truck of claim 9 wherein said distal boom segment is substantially longer than either of the other two boom segments.

11. An articulated boom for attachment to a truck for handling a mixture of air and finely divided solid materials comprising:
    a frame support attachable to the forward section of a truck;
    a horizontal turntable pivotally attached to a base supported at an elevated position by said frame support;
    swing means interacting with said turntable to rotate said turntable at least 90° to either the right or left of a centrally oriented position;
    a boom anchor segment fixed to said turntable and oriented substantially in a horizontal position;
    an intermediate boom segment attached to the free end of said anchor segment by a hinge joint which permits the intermediate segment to swing in a vertical arc;
    a distal boom segment attached to the free end of said intermediate segment by a hinge joint which permits the distal segment to swing in a substantially horizontal arc when said intermediate segment is positioned horizontally;
    extension means connecting said distal segment to said intermediate segment to fold and extend said distal segment with respect to said intermediate segment;
    elevation means attached to said intermediate segment to swing said intermediate segment in a vertical arc about its hinge joint attachment to said intermediate segment.

12. The articulated boom of claim 11 wherein said distal segment is a hollow, self-supporting conduit for transporting an air/material mixture.

13. The articulated boom of claim 11 wherein said anchor segment and said intermediate segment are about equal in length.

14. The articulated boom of claim 11 wherein the length of the distal segment is substantially greater than the combined lengths of the anchor and intermediate segments.

15. The articulated boom of claim 11 wherein said extension means comprises a hydraulic cylinder and piston interconnecting said intermediate and distal segments with one end of said cylinder offset from the boom centerline.

* * * * *